United States Patent [19]

Jasper et al.

[11] Patent Number: 5,553,102
[45] Date of Patent: Sep. 3, 1996

[54] DIVERSITY RECEPTION COMMUNICATION SYSTEM WITH MAXIMUM RATIO COMBINING METHOD

[75] Inventors: Steven C. Jasper, Hoffman Estates; Mark A. Birchler, Roselle; Nicholas C. Oros, Schaumburg, all of Ill.

[73] Assignee: Motorola, Inc., Schaumburg, Ill.

[21] Appl. No.: 348,027

[22] Filed: Dec. 1, 1994

[51] Int. Cl.⁶ .................................................. H04B 7/10
[52] U.S. Cl. .......................................... 375/347; 455/137
[58] Field of Search ..................................... 375/347, 349, 375/260, 267; 455/135, 303, 132, 133, 134, 137, 273

[56] References Cited

U.S. PATENT DOCUMENTS

| | | | |
|---|---|---|---|
| 5,031,193 | 7/1991 | Atkinson et al. | 375/347 |
| 5,140,615 | 8/1992 | Jasper et al. | 375/100 |
| 5,297,171 | 3/1994 | Koch | 375/347 |
| 5,321,850 | 6/1994 | Bäckström et al. | 375/347 |

*Primary Examiner*—Stephen Chin
*Assistant Examiner*—Kevin Kim
*Attorney, Agent, or Firm*—Andrew S. Fuller

[57] ABSTRACT

In a diversity reception communication system (200), a method is provided for recovering data symbols (213) from a transmitted signal. Multiple signals representing the transmitted signal are received via corresponding multiple reception paths (201, 202). For each reception path, values are determined for noise (206), channel quality (207), and for a weighting factor (209) as a function of the channel quality. The signals are processed using diversity combining (212) which includes the weighting factor (209) for each reception path, to provide a resultant signal that more likely represents the transmitted signal than any of the received signals alone. The data symbols (213) are recovered from the resultant signal.

17 Claims, 2 Drawing Sheets

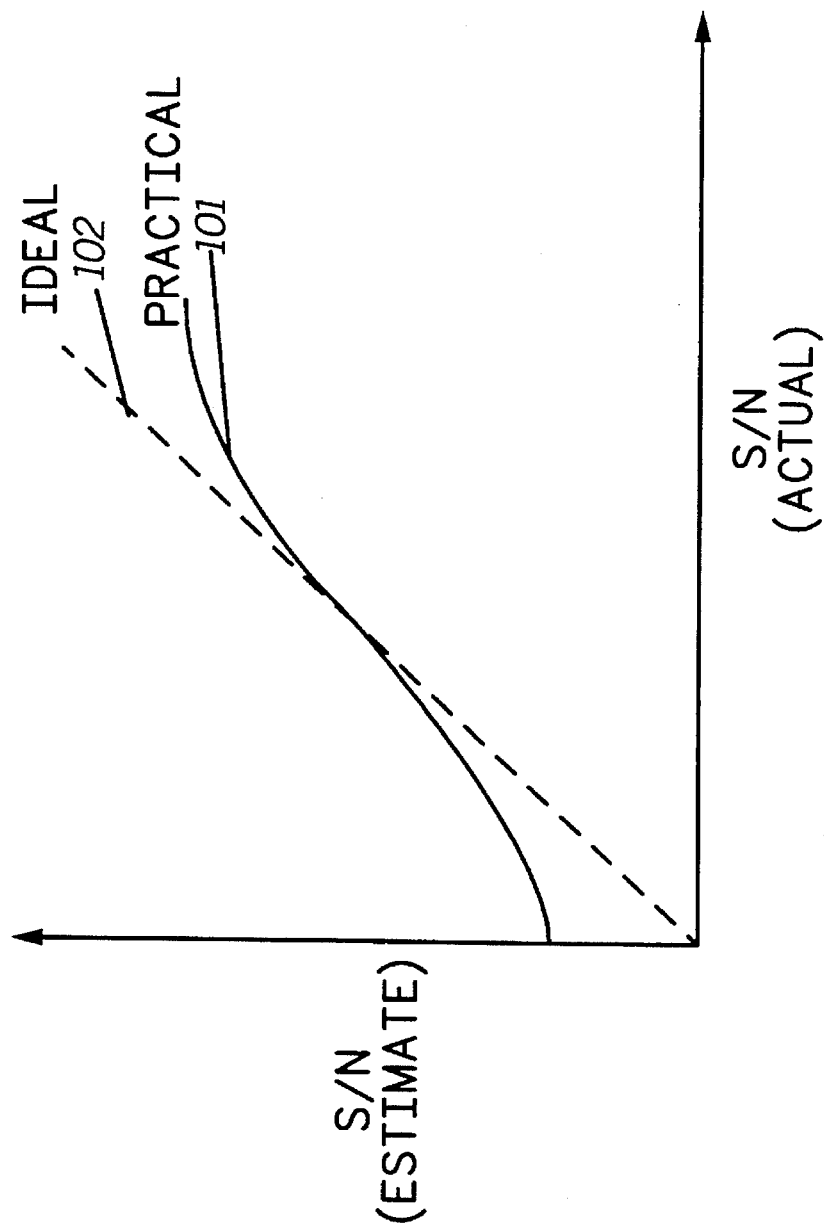

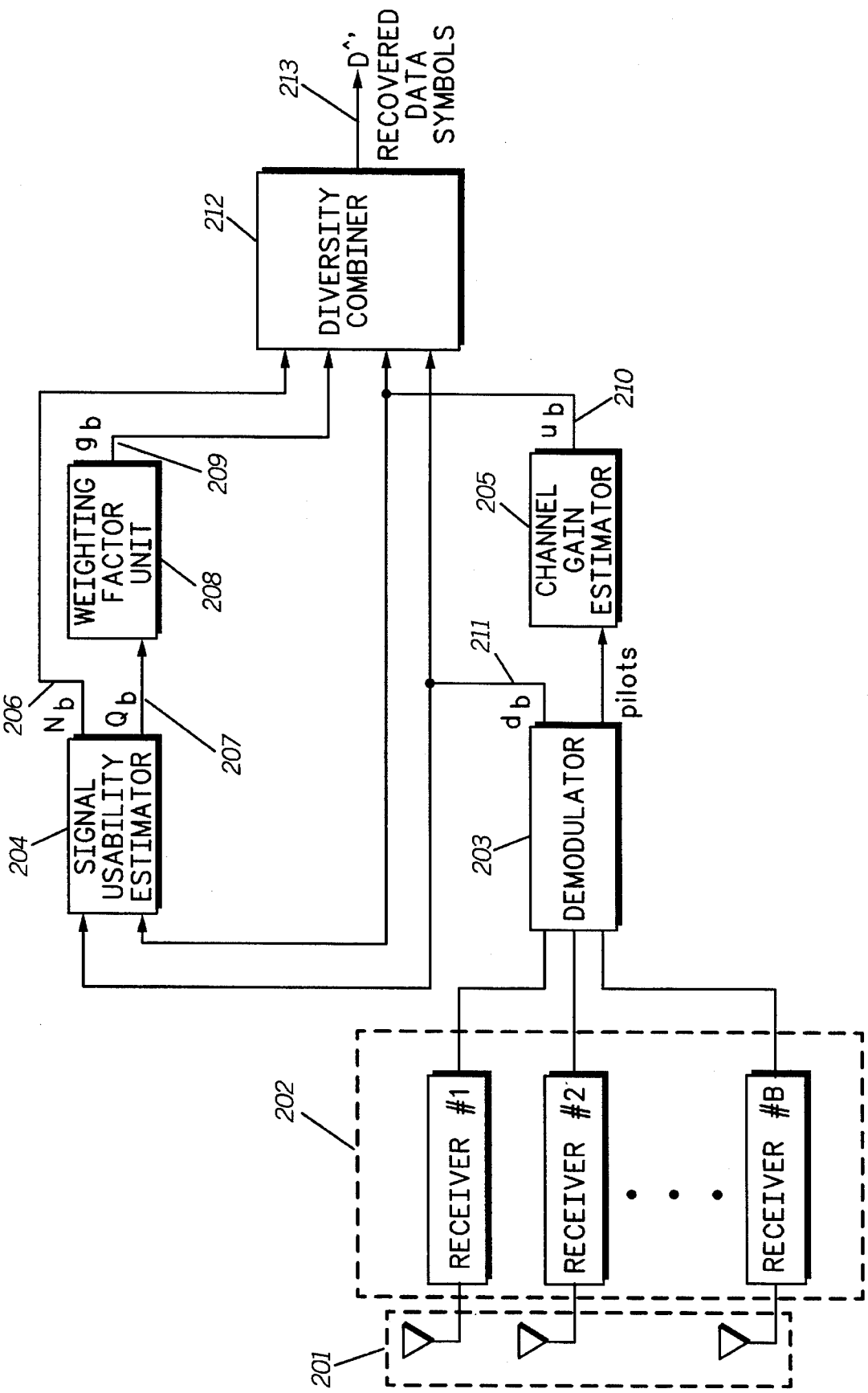

DIVERSITY RECEPTION COMMUNICATION SYSTEM WITH MAXIMUM RATIO COMBINING METHOD

TECHNICAL FIELD

This invention relates in general to radio frequency communication systems, and more particularly, to a diversity combining technique used to combat the effects of fading in radio frequency communication systems.

BACKGROUND OF THE INVENTION

A radio frequency (RF) communication device may be subjected to fading phenomena which introduce distortion into a signal being received. These phenomena also increase the detrimental effect of additive noise on the received signal. One approach to overcoming the effects of fading is the use of a space diversity receiver system.

In a typical space diversity system, multiple receive antennas provide reception paths which are employed to receive a common source signal. Signal resolution hardware and software process the individual signals on the various reception paths, which are commonly referred to as diversity branches. The antennas are typically separated from one another by a great enough distance to guarantee that the received signals have been affected by uncorrelated fading a high proportion of the time. Thus, the probability that the received signals on all diversity branches are simultaneously experiencing deep fades is significantly less than the probability that any single received signal is experiencing a deep fade. With an appropriate combining algorithm, these received signals can be combined is such a way that the resultant signal is consistently of higher usability than is any of the individual, constituent signals.

A method well known in the art for combining these branch signals is called maximum ratio combining ("max-ratio"), see William C. Y. Lee, *Mobile Communications Engineering*, McGraw-Hill Book Company, New York, Copyright 1982. Using the max-ratio technique, the branch signals are adjusted so that they are in-phase, and then weighted in proportion to their individual signal amplitude to noise power ratios, before being combined via summation.

However, in practical implementations of max-ratio combining, delivered performance is degraded due to the presence of defects in the estimation of the signal amplitude to noise power ratios. Accordingly, a need arises for a method of max-ratio combining in a diversity system which does not substantially suffer from this problem.

BRIEF DESCRIPTION OF THE DRAWINGS

FIG. 1 is a graph comparing the output of a typical signal usability estimator, based on a signal to noise ratio, with an ideal output.

FIG. 2 is block diagram of a communication device employing a signal diversity reception system, in accordance with the present invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Generally, the present invention provides a diversity reception communication system that employs a maximum ratio combining technique to recover transmitted signals. Recognizing the presence of defects in available techniques for estimating signal and noise powers (and their ratios) from various diversity branches, the present invention uses a modified form of the max-ratio technique to perform space diversity combining. In particular, signal-to-noise ratio or signal usability estimates are weighted depending on expected reliability, and/or other factors, when used in the processing for recovering transmitted signals.

For the purposes of establishing a framework for discussion, a basic description of the parameters governing a max-ratio diversity combining method is presented. Assume that a communication device has a receiver that includes a demodulator and diversity combiner for processing a signal received on a transmission channel on multiple reception paths or diversity branches. By utilizing a well-known technique of complex, baseband communication system analysis, it can be shown that a data symbol, D, selected, for example, from a quadrature amplitude modulated (QAM) data constellation, having traversed a fading, additive noise channel, will be received as a signal, d, having the following mathematical expression:

$$d = uD + n,$$

where "d" is the output of the demodulator sampled at the best data symbol instant, "u" is the fading gain of the channel at the data symbol sampling instant, and "n" is the noise plus interference of the transmission channel at the data symbol sampling instant. Hereinafter, "n" is referred to as the noise term, with the understanding that interference is another form of noise. Additionally, all quantities in the above equation are of complex type.

Given the above defined notation and quantities, the equation for max-ratio diversity combining that obtains an estimate $D^\wedge$ of the original transmitted data symbol D can be expressed as follows:

$$D^\wedge = ? \frac{\sum_{b=1}^{B} d_b u_b^* / N_b}{\sum_{b=1}^{B} |u_b|^2 / N_b}$$

where "=?" denotes a decision operation or function, whereby $D^\wedge$ is selected as the most likely symbol to have been transmitted (by, for example, comparing the right-hand quantity, "the decision variable", to a set of decision thresholds); the subscript "b" indicates that the quantity in question exists on branch number b of the diversity system; "$u_b$" is a channel gain estimate; "$d_b$" is an estimate of a data symbol from a particular diversity branch b; "$N_b$" is an average noise power term from branch b; "B" is the total number of diversity branches comprising the system; and the symbol "*" represents the complex conjugate of the term that immediately precedes it.

Various methods of estimating the channel gain, $u_b$, are known in the art. One such method is described in U.S. Pat. No. 5,140,615, issued to Jasper et al. on Aug. 18, 1992, for a Maximal Ratio Diversity Combining Technique (hereinafter "Jasper et al."), the full disclosure of which is hereby incorporated by reference. The quantity referred to herein as $u_b$ in this description is called the complex channel gain in Jasper et al. Note that Jasper et al. teaches the use of time domain pilot symbols as the means by which the complex channel gain estimates, $u_b$, are determined.

A deficiency of the above described combining algorithm relates to the problem of estimating the branch noise powers $N_b$. This deficiency will be explained within the context of the more general problem of estimating signal usability, that is, of estimating signal-to-noise power ratio (S/N). FIG. 1 shows a graph comparing an ideal signal usability estimator plot 102, and a practical signal usability estimator plot 101. The ideal plot 102 shows the expectation of the estimated signal-to-noise power ratio, $(S/N)_{ideal}$, as a function of the actual signal-to-noise power ratio, $(S/N)_{actual}$. The functional relationship between these two quantities can be expressed as a straight line of slope one and intercept zero, i.e., $(S/N)_{ideal}=(S/N)_{actual}$. The plot 101 shows the functional relationship for a practical signal usability estimation system. Note that there is a saturation effect occurring at both the high and low extreme values of actual signal-to-noise. In other words, on the high side, once the actual S/N exceeds some value, the estimated S/N no longer increases in value. On the low side, at some point, the estimated S/N stops decreasing as the actual S/N decreases. Both of these undesired saturation effects are caused by problems with estimating the noise power. The high-side saturation effect is generally caused by the existence of distortion processes in the transmit and receive signal processing systems. These undesired processes induce errors into the signal for which compensation is generally not possible. Once the channel induced noise power falls below some value, these error signals begin to dominate, thus preventing the estimated S/N from exceeding the signal-to-distortion power level. The effects of high-side saturation on a max-ratio diversity combining algorithm are negligible in practical cases and will not be considered further.

The low-side saturation effect is due to the specific means used to estimate received noise samples. For example, noise estimates may be obtained from the difference between estimates of the received data symbols adjusted by estimates of channel gain, and the received data signal. As the noise term increases, the probability increases for an erroneous estimate of the transmitted symbol. In this case, the noise sample will be calculated with respect to an erroneous choice for the nearest data symbol, thus limiting the magnitude of the noise sample estimate. Since the magnitude of the noise estimate samples are thus limited, the corresponding average power of these estimates is also limited to some maximum value. Thus, the ratio of estimated S/N is also limited on the low-side by this process.

The noise power estimation saturation effect can seriously impair the performance of a practical max-ratio diversity combining system. Recall that the prior art max-ratio combiner weighs each branch signal by the inverse of the noise power present in that branch. Thus, as the noise power of a particular branch increases with respect to the other branches, the relative weight given to that particular branch decreases proportionally. In the limit, as the noise power of a given branch approaches infinity, the combining weight given to that branch should ideally approach zero. Note that in plot 101, the practical signal-to-noise power estimate does not decrease below some positive, non-zero value due to the above described low-side saturation of the noise power estimate. Thus, the combining weight of a particular branch will, at some point, stop decreasing as the actual noise power on that branch increases. In this case, the combining weight given to a particular branch can be much higher than would have been assigned using an ideal noise power estimator. A solution to the above described noise power saturation problem based only on the measured branch noise powers is not sufficient because the prior art max-ratio diversity combining algorithm has the property that the S/N at the output of the combiner is equal to the sum of the individual, input branch S/N's, i.e., $$(S/N)_{out} = \sum_{b=1}^{B} ((S/N)_b).$$

Thus, a particular branch can have the highest noise power and still be a useful branch if the corresponding signal power is such that the S/N ratio is high.

The consequence of the above-described noise power saturation problem is that a particularly poor signal branch can be given far too high a weight in the combining calculation. Because of this problem, it is possible for the output of the diversity combiner to be of poorer usability than that of one of the individual branches. As a result, the communication system performance may be worse with diversity combining than if a single branch, non-diversity combined receiver had been used.

FIG. 2 is block diagram of a communication device 200 having a signal diversity reception system that addresses the problems associated with defects occurring when generating signal usability estimates, in accordance with the present invention. In the communication device 200, multiple antennas 201 and associated receivers 202 form corresponding reception paths that receive source signals on a transmission channel which began from a common point of transmission. A total of B antennas 201 and associated receivers 202 are shown. The signals are 16-bit QAM signals which presumably have experienced distortion by the transmission channel. In the receivers 202, the signals are down-converted to zero frequency and pulse shape filtered. A demodulator 203 has inputs operably coupled to the receivers 202 to receive a modulated signal as transmitted via the reception paths. The demodulator 203 samples each of the received signals and outputs pilot and data symbol samples, "$d_b$", separated from the modulated signals. The pilot symbols are sent to a channel gain estimator 205, which is operably coupled to the demodulator 203 (this processing is described in Jasper et al.). The channel gain estimator 205 outputs an estimate of the fading gain "$u_b$" of the channel or reception path corresponding to each data symbol for each received signal.

The channel gain estimates, "$u_b$", are sent to a signal quality or usability estimator 204, which is operably coupled to both the demodulator 203 and the channel gain estimator 205. The signal usability estimator 204 also receives data symbols $d_b$ 211 as recovered by the demodulator 203 from the modulated signals. The signal usability estimator 204 determines and outputs noise values representing estimates of the interference plus noise power of each signal branch or reception path. The noise value for the b'th signal is labeled "$N_b$" 206. The signal usability estimator 204 also determines a channel quality value, "$Q_b$," 207, which is an estimate of the ratio of signal power to noise power, "$S_b/N_b$", for each reception path.

These quantities, i.e., $S_b$ and $N_b$, can be calculated within the signal usability estimator 204 in the following manner. Recall that the quantity $d_b$ is equal to $[u_b D + n_b]$. An tentative estimate of the transmitted data symbol ($\hat{D}_b$) can be obtained for each diversity branch by dividing $d_b$ by $u_b$ and passing the resulting value through a decision operation. If the communication system is operating under reasonable conditions, $\hat{D}_b$ will equal D most of the time. Once this estimated symbol has been obtained, the noise component estimate (i.e., $\hat{n}_b$) can be calculated by the expression:

$n_b\hat{} = d_b - u_b D_b\hat{}$.

The quantity $N_b$ is then calculated as the average of the magnitude squared of these noise components, i.e., $N_b = E\{|n_b\hat{}|^2\}$, where $E\{\}$ represents an expected value. The quantity $S_b$ can be calculated by averaging the magnitude squared of the complex channel gain estimates, and multiplying by the power of the data symbols, i.e., $S_b = E\{|u_b|^2\}E\{|D|^2\}$, where $E\{|D|^2\}$ can be predetermined based on the data constellation.

The channel quality value 207 for each of the received signals is sent to a weighting factor unit 208, which is operably coupled to the signal usability estimator 204. The weighting factor unit 208 determines weighting factors, "$g_b$," 209, for each of the received signals, based on at least one channel quality value. The weighting factor unit 208 is described in more detail below. A diversity combiner 212, operably coupled to the weighting factor unit 208, takes as inputs the channel gain estimates 210, data symbols 211, weighting factors 209, and noise values 206, and outputs recovered data symbols, "$D\hat{}$" 213. Thus, the diversity combiner processes the received signals using a diversity combining algorithm that includes the weighting factor for each of the reception paths, to provide a resultant signal that more likely represents a signal as originally transmitted from the common point of transmission than any of the received signals alone.

The weighting factor unit 208 calculates the weighting factors 209 as a function of the channel quality values 207 corresponding to respective reception paths, and may include one or more channel quality values. In general, this operation can be described mathematically as:

$$\{g_1, g_2, \ldots, g_B\} = f(Q_1, Q_2, \ldots, Q_B)$$

where $f(Q_1, Q_2, \ldots, Q_B)$ denotes a function of B variables and the set $\{g_1, g_2, \ldots, g_B\}$ denotes a set of B function outputs. Many suitable functions exist which can produce beneficial results. By way of example, one specific function using ratios of channel quality values defines each weighting factor as given by:

$$g_b = \begin{array}{ll} 0; & Q_b/Q_{max} < \text{threshold} \\ \text{or} & \\ 1; & Q_b/Q_{max} > \text{threshold} \end{array}$$

where $Q_{max}$ is defined as:

$$Q_{max} = \text{maximum}\{Q_1, Q_2, \ldots Q_B\}.$$

In a practical implementation of this invention, the above mentioned threshold may be set to a value of 0.1. Thus, if any of the branches has a channel quality value which is less than one-tenth the magnitude of the maximum (i.e., $Q_{max}$), the weighting factor for that branch will be set to zero.

The diversity combiner 212 uses the weighting factors 209 to perform a modified form of max-ratio combining to obtain estimates, $D\hat{}$, of the data symbols. The operation of the diversity combiner can be described by the equation, where as before "=?" denotes a decision operation:

$$D\hat{}' = ? \frac{\sum_{b=1}^{B} d_b u_b^* g_b/N_b}{\sum_{b=1}^{B} |u_b|^2 g_b/N_b}$$

To illustrate this method, consider a three branch example. First, the channel gain estimates, noise values, and channel quality values are calculated. Then the maximum, $Q_{max}$, of the channel usability values is found. The weighting factors are calculated as:

$$g_1 = \begin{array}{ll} 0; & Q_1/Q_{max} < \text{threshold} \\ \text{or} & \\ 1; & Q_1/Q_{max} > \text{threshold} \end{array}$$

$$g_2 = \begin{array}{ll} 0; & Q_2/Q_{max} < \text{threshold} \\ \text{or} & \\ 1; & Q_2/Q_{max} > \text{threshold} \end{array}$$

$$g_3 = \begin{array}{ll} 0; & Q_3/Q_{max} < \text{threshold} \\ \text{or} & \\ 1; & Q_3/Q_{max} > \text{threshold} \end{array}$$

These weighting factors are then used by the diversity combiner 212 according to the equation (which is a simple expansion of the previously presented combining equation):

$$D\hat{}' = ? \frac{\frac{d_1 u_1^* g_1}{N_1} + \frac{d_2 u_2^* g_2}{N_2} + \frac{d_3 u_3^* g_3}{N_3}}{\frac{g_1|u_1|^2}{N_1} + \frac{g_2|u_2|^2}{N_2} + \frac{g_3|u_3|^2}{N_3}}$$

to obtain an estimate of the received symbol.

Use of the modified max-ratio diversity combining, according to the present invention, alleviates the low-side saturation problem described above. If the signal usability of one branch is so low that it is in the low-side saturation region while the signal usability of another branch is much greater, the low usability branch is simply turned off rather than allow the diversity combined signal estimate to be degraded.

By utilizing the above described modified max-ratio diversity combining technique, a practical means of approximating the performance of an ideal max-ratio combining system has been created. That is, the performance of the modified max-ratio combiner using the practical S/N estimator 101 is almost the same as that which would be obtained by using the prior art max-ratio combiner with the ideal S/N estimator 102. Thus, a practical means of obtaining the full benefits of max-ratio combining has been disclosed.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. In a diversity reception communication system, a method of recovering data symbols from a transmitted signal comprising the steps of:

receiving, via a plurality of reception paths, a plurality of signals representing the transmitted signal;

determining, for each of the plurality of signals, a noise value that corresponds to noise for each of the plurality of reception paths;

determining a channel quality value that corresponds to channel quality for each of the plurality of reception paths;

determining a weighting factor for each of the plurality of reception paths as a function of at least two channel quality values, each comprising a channel quality value for a separate reception path;

determining a channel gain estimate for each of the plurality of reception paths;

processing the plurality of signals using diversity combining, which diversity combining includes the channel gain estimate, and an application of the weighting factor to a function of the noise value for each of the plurality of reception paths, to provide a resultant signal that more likely represents the transmitted signal than any of the plurality of signals alone; and recovering data symbols from the resultant signal.

2. The method of claim 1, wherein the step of determining a weighting factor includes the step of determining the weighting factor for a particular reception path using a channel quality value corresponding to the particular reception path.

3. The method of claim 1, wherein the step of determining the weighting factor for each of the plurality of reception paths as a function of at least two channel quality values, comprises the step of selecting, as one of the at least two channel quality values, a channel quality value that corresponds to a particular reception path for which the weighting factor is being determined.

4. The method of claim 1, wherein the step of determining a weighting factor for each of the plurality of reception paths as a function of at least two channel quality values, includes the step of determining a weighting factor for each of the plurality of reception paths as a function of a ratio of at least one channel quality value to another channel quality value.

5. The method of claim 1, wherein the step of determining a weighting factor for each of the plurality of reception paths as a function of at least two channel quality values, includes the step of determining a weighting factor for each of the plurality of reception paths as a function of a ratio of the channel quality value that corresponds to a particular reception path for which the weighting factor is being determined and a maximum channel quality value selected from among the plurality of reception paths.

6. A method for recovering a transmitted data symbol using a diversity reception system, comprising the steps of:

receiving, via a plurality of B diversity branches, a corresponding plurality of data symbols, $d_b$, representing the transmitted data symbol;

determining, for each of the plurality of data symbols, $d_b$, a noise value, $N_b$, that corresponds to noise for each of the plurality of B diversity branches;

determining a channel gain value, $u_b$, that corresponds to channel gain for each of the plurality of B diversity branches;

determining a weighting factor, $g_b$, for each the plurality of B diversity branches as a function of at least one channel quality value, $Q_b$;

determining an estimate, $D^\sim$, for the transmitted data symbol, wherein $D^\sim$ is a function of:

$$\frac{\sum_{b=1}^{B} d_b u_b^* g_b/N_b}{\sum_{b=1}^{B} |u_b|^2 g_b/N_b} \text{ ; and}$$

outputting the estimate, $D^\sim$, for the transmitted data symbol.

7. The method of claim 6, further comprising the steps of:

determining a maximum value, $Q_{max}$, for the at least one channel quality value, $Q_b$, of the plurality of B diversity branches; and determining that $g_b=0$, when $Q_b/Q_{max}$ is less than a particular threshold, and $g_b=1$, when $Q_b/Q_{max}$ is greater than the particular threshold.

8. A communication device, comprising:

a demodulator having a plurality of inputs operably coupled to receive a plurality of modulated signals as transmitted via at least a plurality of reception paths and an output providing estimated data signals as recovered from the plurality of modulated signals;

a channel gain estimator operably coupled to the demodulator and having an output providing channel gain estimates that correspond to at least a first reception path;

a signal usability estimator operably coupled to both the demodulator and the channel gain estimator and having a first output providing noise values that correspond to noise for at least the first reception path and a second output providing channel quality values that correspond to channel quality for at least the first reception path;

a weighting factor unit, operably coupled to the signal usability estimator, to receive channel quality values corresponding to the plurality of reception paths, including the first reception path, and having an output providing a weighting factor for each of the plurality of reception paths based on at least two channel quality values, each corresponding to a separate reception path; and a diversity combiner operably coupled to the weighting factor unit, the signal usability estimator, the channel gain estimator, and the demodulator, and having an output providing recovered data symbols, the diversity combiner using the channel gain estimate in combination with an application of the weighting factor to a function of the respective noise value for each of the plurality of reception paths in deriving the recovered data symbols.

9. The method of claim 6, wherein the step of determining a weighting factor includes the step of determining the weighting factor for a particular diversity branch using a channel quality value corresponding to the particular diversity branch.

10. The method of claim 6, wherein the step of determining a weighting factor includes the step of determining the weighting factor for each of the plurality of B diversity branches as a function of at least two channel quality values each comprising a channel quality value for a separate diversity branch.

11. The method of claim 10, wherein the step of determining the weighting factor for each of the plurality of B diversity branches as a function of at least two channel quality values, comprises the step of selecting, as one of the at least two channel quality values, a channel quality value that corresponds to a particular diversity branch for which the weighting factor is being determined.

12. The method of claim 10, wherein the step of determining a weighting factor for each of the plurality of B diversity branches as a function of at least two channel quality values, includes the step of determining a weighting factor for each of the plurality of B diversity branches as a function of a ratio of at least one channel quality value to another channel quality value.

13. The method of claim 10, wherein the step of determining a weighting factor for each of the plurality of B diversity branches as a function of at least two channel quality values, includes the step of determining a weighting factor for each of the plurality of B diversity branches as a function of a ratio of the channel quality value that corresponds to a particular diversity branch for which the weighting factor is being determined and a maximum channel quality value selected from among the plurality of B diversity branches.

14. The method of claim 6, further comprising the steps of:

determining a maximum value, $Q_{max}$ for the at least one channel quality value, $Q_b$, of the plurality of B diversity branches; and determining that $g_b$ has a first value, when $Q_b/Q_{max}$ is less than a particular threshold, and $g_b$ has a second value different from the first value, when $Q_b/Q_{max}$ is greater than the particular threshold.

15. The communication device of claim 8, wherein the weighting factor is derived from a function of a ratio of at least one channel quality value to another channel quality value.

16. The communication device of claim 8, wherein the weighting factor is derived from a function of a ratio of the channel quality value that corresponds to a particular reception path and a maximum channel quality value selected from among the plurality of reception paths.

17. The method of claim 16, wherein:

$Q_b$ is the at least one channel quality value; and $Q_{max}$ is a maximum value of the channel quality values of at least some of the plurality of reception paths; and the weighting factor has a first value, when $Q_b/Q_{max}$ is less than a particular threshold, and the weighting factor has a second value different from the first value, when $Q_b/Q_{max}$ is greater than the particular threshold.

* * * * *